United States Patent
Lacan et al.

(10) Patent No.: US 7,629,053 B2
(45) Date of Patent: Dec. 8, 2009

(54) PROCESS FOR TREATING AN OPHTHALMIC LENS

(75) Inventors: Pascale Lacan, Paris (FR); Dominique Conte, Saint-Dizier (FR)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 811 days.

(21) Appl. No.: 10/501,600

(22) PCT Filed: Jan. 13, 2003

(86) PCT No.: PCT/EP03/00226

§ 371 (c)(1),
(2), (4) Date: Dec. 21, 2004

(87) PCT Pub. No.: WO03/057641

PCT Pub. Date: Jul. 17, 2003

(65) Prior Publication Data
US 2005/0115923 A1 Jun. 2, 2005

(30) Foreign Application Priority Data
Jan. 14, 2002 (FR) .................................. 02 00388

(51) Int. Cl.
*B32B 9/00* (2006.01)
*C09D 5/00* (2006.01)
(52) U.S. Cl. ...................... 428/432; 428/412; 427/523; 427/154
(58) Field of Classification Search ........................ None
See application file for complete search history.

(56) References Cited

U.S. PATENT DOCUMENTS

| 2,392,768 A | 1/1946 | Ryan ........................... 428/436 |
| 2,536,075 A | 1/1951 | MacNutt ...................... 134/28 |
| 4,085,248 A | 4/1978 | Zehender et al. ............ 428/336 |
| 4,387,960 A | 6/1983 | Tani ........................... 359/588 |
| 4,410,563 A | 10/1983 | Richter et al. ............... 422/108 |
| 4,826,548 A | 5/1989 | Herbin et al. ............... 156/152 |

(Continued)

FOREIGN PATENT DOCUMENTS

EP  203730  12/1986

(Continued)

OTHER PUBLICATIONS

Database WPI, Section CH, Week 198819, Derwent Publications Ltd., London, GB, XP002214922, 1987.

(Continued)

*Primary Examiner*—Timothy M Speer
(74) *Attorney, Agent, or Firm*—Fulbright & Jaworski L.L.P.

(57) ABSTRACT

The present invention relates to a process for treating an ophthalmic lens comprising two main sides the first one of which comprises a thin external organic or inorganic layer, comprising:—at least one treatment step for the second lens side through energetic and/or reactive species capable to perform a surface physical attack and/or chemical modification,—in option, at least one or more steps for depositing inorganic or organic layers carried out simultaneously or subsequently to the treatment step through said energetic and/or reactive species, characterized in that before the treatment step through energetic and/or reactive species, a deposition of a temporary protective layer is performed onto the thin external organic or inorganic layer. Application to ophthalmic optics.

48 Claims, 2 Drawing Sheets

U.S. PATENT DOCUMENTS

Figure 1:
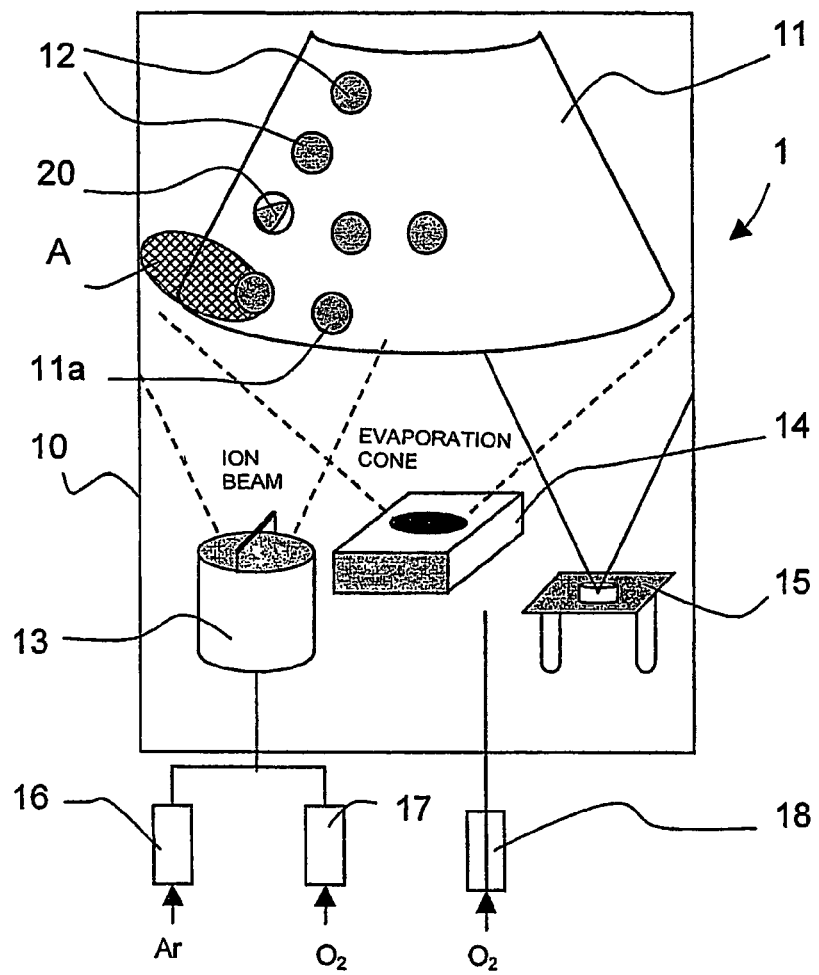

| | | | |
|---|---|---|---|
| 4,959,118 A | 9/1990 | Herbin et al. | 156/512 |
| 5,211,759 A | 5/1993 | Zimmermann et al. | 118/723 |
| 5,328,768 A | 7/1994 | Goodwin | 428/428 |
| 5,582,907 A | 12/1996 | Pall | 442/351 |
| 5,680,013 A | 10/1997 | Dornfest et al. | 315/111.21 |
| 5,792,537 A | 8/1998 | Ohlin, Jr. | 428/45 |
| 5,800,918 A | 9/1998 | Chartier et al. | 428/336 |
| 5,919,563 A | 7/1999 | Parrish, Jr. et al. | 428/354 |
| 6,143,143 A | 11/2000 | Walls et al. | 204/192.26 |
| 6,143,358 A | 11/2000 | Singh et al. | 427/162 |
| 6,149,750 A | 11/2000 | Parish, Jr. et al. | 156/154 |
| 6,277,485 B1 | 8/2001 | Invie et al. | 428/336 |
| 6,364,823 B1 | 4/2002 | Garibaldi et al. | 600/12 |
| 6,413,413 B1 | 7/2002 | Smith | 208/209 |
| 6,682,773 B2 | 1/2004 | Medwick et al. | 427/154 |
| 6,863,965 B2 | 3/2005 | Fujinawa et al. | 428/215 |
| 6,884,432 B2 | 4/2005 | Yaszemski et al. | 424/460 |
| 2003/0049370 A1* | 3/2003 | Lacan et al. | 427/165 |
| 2003/0059623 A1 | 3/2003 | O'Shaughnessy et al. | 428/428 |
| 2006/0246278 A1 | 11/2006 | Lacan et al. | 428/336 |
| 2007/0141358 A1 | 6/2007 | Jallouli et al. | 428/426 |
| 2007/0183056 A1 | 8/2007 | Conte et al. | 359/642 |

FOREIGN PATENT DOCUMENTS

| | | |
|---|---|---|
| EP | 614957 | 9/1994 |
| EP | 749021 | 12/1996 |
| EP | 844265 | 5/1998 |
| EP | 933377 | 8/1999 |
| FR | 2824821 | 5/2001 |
| JP | 60135167 | 7/1985 |
| JP | 2000-147204 | 5/2000 |
| JP | 2004-122238 | 4/2004 |
| JP | 2004-148444 | 5/2004 |
| WO | WO 97/10923 | 3/1997 |
| WO | WO 00/68326 | 11/2000 |
| WO | WO 01/02496 | 1/2001 |
| WO | WO 02/092524 | 11/2002 |
| WO | WO 03/006704 | 6/2003 |
| WO | WO 03/057641 | 7/2003 |
| WO | WO 2005/012955 | 2/2005 |
| WO | WO 2005/015270 | 2/2005 |
| WO | WO 2006/092002 | 9/2006 |

OTHER PUBLICATIONS

U.S. Appl. No. 10/573,692, filed Mar. 27, 2006, Lacan et al.

Gutowski, "The relationship between strength adhesive bond and the thermodynamic properties of its components," *Int. J. Adhesion and Adhesives*, 7:189-198, 1987.

March, *Advanced Organic Chemistry*, 4$^{th}$ ed., John Wiley & Sons, publishers, 1992.

Owens and Wendt, "Estimation of the surface free energy of polymers," *J. Appl. Polymer Sci.*, 13:1741-1747, 1969.

Sobieski and Tangney., *Handbook of Pressure-Sensitive Adhesive Technology*, 2$^{nd}$ Ed., D. Satas, ed., Van Nostrand Reinhold, New York, pp. 508-517, 1989.

Office Communication, issued in Japanese Patent Application No. JP 2003-557962, dated Dec. 9, 2008. (English Translation).

* cited by examiner

OIL TEST ON A CORRECT HYDROPHOBIC/ OLEOPHOBIC TREATMENT

OIL TEST ON AN ALTERED HYDROPHOBIC/ OLEOPHOBIC TREATMENT (FOR EXAMPLE DURING IPC OR IAD OF THE SECOND SIDE)

GOOD

BAD

PROCESS FOR TREATING AN OPHTHALMIC LENS

This application is a national phase application under 35 U.S.C. § 371 of International Application No. PCT/EP03/00226 filed 13 Jan. 2003, which claims priority to French Application No. 02/00388 filed 14 Jan. 2002, the entire contents of both of which applications are incorporated herein by reference.

The present invention relates to a process for obtaining an ophthalmic lens comprising two main sides, the first one at least bearing an external organic or inorganic thin layer modifying the lens surface properties.

More precisely, the process allows to obtain an ophthalmic lens comprising two main sides, each one bearing a multilayer coating, the external layer of which is a thin layer with hydrophobic and/or oleophobic properties.

Typically, the ophthalmic lenses bearing a multilayer coating are obtained by deposition on the lens surface of evaporated materials in vacuum enclosures.

According to a conventional arrangement, the lenses are located on a rotating carrousel or cover being arranged in the upper part of the vacuum enclosure and wherein locations, more particularly circular holes, are provided, above which lenses are to be located.

Conventionally, the following terms will be used therein:
treatment area: the area located in the lower part of the enclosure comprising the material source to be deposited and bound by the internal lower surface within the enclosure and the surface on the rotating carrousel,
round lens: a circular lens.

Each round lens is held in contact with the carrousel on the periphery thereof and its side to be coated is oriented toward the treatment area.

More precisely, each lens is arranged on an annular ring-shaped independent holding part the diameter of which is slightly lower than the lens diameter so that the lens sits on the ring only on the periphery thereof. The ring also comprises elastic means providing a good positioning for the ring.

The so-formed assembly is then arranged above the chosen carrousel hole, the ring sitting then on the hole periphery and being made integral with the carrousel through appropriate locking means.

The material to be evaporated is arranged in a crucible being placed on the lower part of the vacuum enclosure and heated generally through an electron beam directed towards the crucible or through a simple Joule effect source according to the nature of the material to be evaporated.

The evaporated material is then deposited on the side to be treated. When the desired thickness is reached, the evaporation of the first material is ceased and then the evaporation of the second material follows.

Generally one of the sides of the ophthalmic lens is wholly treated, then this side is turned upside down so as to direct the untreated side towards the source of the material to be deposited, afterwards this last side of the lens is submitted to a treatment being generally the same as for the first side.

One of the technical problems met upon treatment operations for the second side is that the integrity of the layers deposited on the first side must be preserved, more particularly the integrity of the external layer.

Such a problem is the more crucial since the external layer of the ophthalmic lens, essentially having the goal to modify the surface energy properties, has a very small thickness, generally less than 30 nm, more frequently from 1 to 20 nm, more preferably from 1 to 10 nm. In the case of specific layers, such as hydrophobic and/or oleophobic layers, the thicknesses may only reach from 2 to 10 nm, or even from 2 to 5 nm.

But it is sometimes necessary to submit the substrate surface to treatments with more energetic species than evaporated molecules (more precisely with an upper energy than 0.1 eV) or reactive species, i.e. different species from each other, which are adapted to react chemically with the substrate surface when contacted.

In particular, before the multilayer coating is deposited, the ophthalmic lens may be submitted to a surface treatment such as an ion bombardment (particularly with rare gases, oxygen or mixtures thereof or nitrogen or air), a plasma treatment or, in the case of inorganic lenses, a corona treatment (typically a treatment with an oxygen plasma at a pressure of $10^{-2}$ mbar).

Such an activation treatment may be also carried out so as to prepare the surface of one of the deposited layers before the deposition of the subsequent layer.

The object being looked for is then essentially to increase the treatment adherence.

It is also possible to apply an ion bombardment to the lens surface upon the evaporation of the layer-forming materials so as to improve the mechanical properties and in particular to compact the layer.

Such a process is conventional and known as "ion-assisted deposition" or IAD.

Although the treatment is carried out mainly on the yet untreated side, the species being generated for the purpose of the activation or compaction treatment are highly energetic and/or reactive and are adapted for altering the already carried out deposits on the lens back side, in particular those lenses located the nearest from the treatment area, i.e. the lenses located on the peripheral part of the carrousel or external crown.

Moreover, it has become frequent to treat lenses being not round as it was conventionally the case, but so-called "pre-calibrated" lenses the thickness of which has been minimized according to their corresponding frame as well as the bearer's sight characteristics (pupil deviation, . . . ) and which have the characteristics to have a shape globally close to the final lens being ready for mounting.

For such a pre-calibrated lens to be fastened the shape of which is any longer circular and the size thereof is smaller than that of the holding part, an intermediate part being adapted into the holding part is used.

Such an intermediate part is globally shaped according to the pre-calibrated lens size so as to enclose the lens on the periphery thereof and is forcibly engaged into the holding part. Thus, the adaptation of the pre-calibrated lens into the above-described holding part is possible.

The treatment of such lenses through conventional devices represents a difficulty.

In fact, unlike the case of a round lens, the pre-calibrated lens surface does not cover the whole circular hole of the carrousel above which the lens/intermediate part/holding part assembly is arranged and consequently a great part of the circular hole forms an opening for energetic and/or reactive species going-through.

Thus, the opposed lens side to the treatment area becomes more accessible for energetic and/or reactive species and thus likely to be altered.

The invention aims at providing a process for reducing or even cancel any problem of alteration for the thin external layer opposed to the treatment area and consists in a process for treating an ophthalmic lens comprising two main sides the first one of which comprises a thin external organic or inorganic layer, comprising:

at least one treatment step for the second lens side through energetic and/or reactive species capable to perform a surface physical attack and/or chemical modification, in option, at least one or more steps for depositing inorganic or organic layers carried out simultaneously or subsequently to the treatment step through said energetic and/or reactive species, characterized in that before the treatment step through energetic and/or reactive species, a deposition of a temporary protective layer is performed onto the thin external organic or inorganic layer.

The invention also relates to a pre-calibrated lens at least one of the sides of which comprises a thin external organic or inorganic layer coated with a temporary protective layer.

Figure 2:
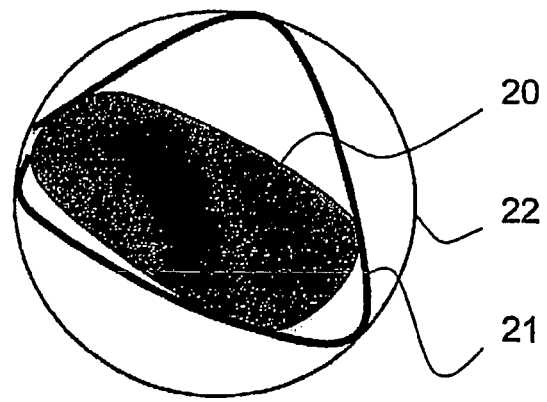
Figure 3:
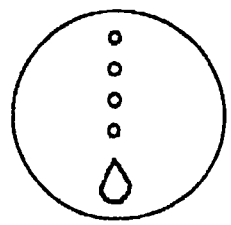
Figure 3:
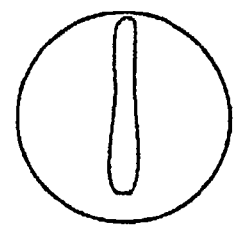

The continuation of the description refers to the accompanying drawings wherein:

FIG. 1 is a schematic view of a vacuum treatment machine for implementing the process according to the invention, FIG. 2 is a schematic view of the fastening system for a pre-calibrated lens into a circular hole of the carrousel of the machine according to FIG. 1, and FIG. 3 shows the results of a wetability test with an oil type product for a right hydrophobic/oleophobic treatment and an altered hydrophobic/oleophobic treatment.

The lens treated according to the invention has already been coated on one of the sides thereof with a thin external layer.

The thin external inorganic or organic layer is preferably a hydrophobic and/or oleophobic surface coating and in particular a hydrophobic and/or oleophobic surface coating deposited on a mono- or multilayer antireflecting coating.

The hydrophobic and/or oleophobic coatings are generally applied to lenses comprising an antireflecting coating, in particular with an inorganic material, so as to reduce their soiling tendency, for example with respect to grease deposits.

Preferably, the hydrophobic and/or oleophobic coatings impart a surface energy lower than 14 mJoules/m$^2$ and more preferably lower than 12 mJoules/m$^2$ (the surface energies being calculated according to Owens-Wendt method disclosed in the following reference: "Estimation of the surface force energy of polymers", Owens D. K., Wendt R. G. (1969) J. APPL. POLYM. SCI., 13, 1741-1474) (mJ=millijoules).

The hydrophobic and/or oleophobic coatings are obtained by coating, on the surface of the antireflecting coating, surface energy reducing compounds for the lens.

Such compounds have been extensively disclosed in the prior art, for example in Patents U.S. Pat. No. 4,410,563, EP0203730, EP749021, EP844265 and EP933377.

Silane-based compounds bearing fluorinated groups, particularly one or more perfluorocarbon or perfluoropolyether groups, are most frequently used.

Examples include silazane, polysilazane or silicone compounds comprising one or more fluorinated groups such as those above-mentioned.

A known process for obtaining a hydrophobic and/of oleophobic layer consists in applying; on the antireflecting coating, compounds bearing fluorinated groups and Si—R groups, R being a —OH group or a precursor thereof, preferably an alkoxy group. Such compounds may carry out on the, antireflecting coating surface, directly or after hydrolysis, polymerization and/or cross-linking reactions.

The coating of the compounds reducing the lens surface energy is conventionally performed by dipping in a solution of said compound or by vapor phase deposition with this last coating type being preferred. Generally, the hydrophobic and/or oleophobic coating has a thickness lower than 30 nm, more frequently from 1 to 20 nm, preferably from 1 to 10 nm, more preferably from 2 to 5 nm.

Before any protective coating deposition, a checking of the optical properties of the lens may be optionally performed, in particular the antireflecting properties thereof.

If the depositions are carried out under vacuum, the atmospheric pressure is restored within the enclosure and then the checking is made.

The protective layer is coated directly onto the thin external layer.

Generally speaking, the protective layer should have a sufficient thickness so as to avoid any subsequent alteration of the properties in the thin external layer upon the various lens treating steps.

The thickness is selected depending on the energy of the reactive species which may incidentally reach the thin external layer surface.

Such energy may vary from 40 to 150 eV with a current density of 30 to 700 microamperes/cm$^2$ at the level of the substrate (lens) surface.

The thickness of the protective layer varies preferably from 5 nm to 10 microns and the protective layer is preferably continuous.

When the protective layer is an inorganic layer, in particular deposited by evaporation, the thickness thereof is preferably from 5 to 200 nm, more preferably 10 to 200 nm.

When the process comprises a treatment step with high energy species such as ions from a ion gun or a plasma, a thicker protective layer will be selected.

Generally if the thickness of the protective layer is too weak, there is a risk that the thin hydrophobic and/or oleophobic layer should not be protected sufficiently.

If on the contrary the thickness of the protective layer is too high, in particular for essentially inorganic protective layers, the inventors have found that mechanical stresses may appear within the layer, which may be prejudicial to the expected properties.

Obviously the protective layer material should be such that it does not alter the surface properties of the hydrophobic and/or oleophobic coating and after the material removal the optical and surface properties of the lens are wholly identical to those shown in the lens before the protective layer deposition.

Preferably the temporary protective layer is of an inorganic material and particularly a metal fluoride or a mixture of metal fluorides, a metal oxide or a mixture of metal oxides.

Examples of fluorides include magnesium fluoride $MgF_2$, lanthanum fluoride $LaF_3$ or cerium fluoride $CeF_3$.

Useful oxides are titanium, aluminum, zirconium or praseodymium oxides.

Mixtures of alumina and praseodymium oxide are recommended.

A particularly recommended commercially available material is the PASO2 from Leybold company.

Examples of temporary protective layers made from an organic material include polytetrafluoroethylene-based layers, for example Teflon®.

The temporary protective layer itself may have multiple layers, in particular two layers.

In that case, it is preferred first to coat, in particular by evaporation under vacuum, on the thin hydrophobic and/or oleophobic layer, a first layer of an inorganic nature in a small thickness (from 2 to 200 nm, preferably 5 to 200 nm), and then a layer of an organic nature is coated onto such a first layer.

Preferably the layer of an organic nature is obtained by deposition and hardening of a latex.

The appropriate latexes are acrylic or methacrylic latexes; or polyurethane latexes such as those sold by Baxenden under the trademark W234 and W240.

Generally the layer of an organic nature coated onto the first inorganic layer is of a thickness much higher than the thickness of the first inorganic layer and the thickness thereof varies typically from 0.2 to 10 microns.

The layer of an organic nature affords a good mechanical protection and may be easily removed by tearing away, for example by drawing the layer from the periphery thereof.

Preferably, the material of the layer of an organic nature is selected so that the adherence at the interface between the first layer of an inorganic nature and the second layer of an organic layer should be higher than at the interface between the hydrophobic and/or oleophobic layer and the first layer of an inorganic nature.

Thus, when the organic layer is torn away, the inorganic layer adhering to the organic layer is also removed.

The protective layer may be coated through any appropriate conventional process, in a vapor phase (deposition under vacuum) or in a liquid phase, for example spraying, centrifugation or dipping.

Generally the antireflecting, hydrophobic and/or oleophobic coatings have been deposited by evaporation in vacuum bells and it is preferred to coat the temporary protective layer with the same technique, whereby the set of operations may be performed sequentially without any excessive manipulation of the lenses between the steps.

Another interest of the vacuum deposition is to prevent any wetability problem in the case where the thin layer on which the protective layer is to be coated shows hydrophobic and/or oleophobic properties.

The protective layer is preferably made from any material allowing for the lens surface energy having hydrophobic and/or oleophobic properties to be increased and which may be removed upon a subsequent operation following the trimming step.

In particular, when the protective layer is made of one or more materials increasing the surface energy with respect to the lens surface having hydrophobic and/or oleophobic properties, such characteristic may be gained profit from for lens trimming.

In fact, an ophthalmic lens results from a sequence of molding, and/or surfacing/polishing operations that define the geometry for both convex and concave optical surfaces of said lens, and then of appropriate surface treatments.

The last finishing step for the ophthalmic lens is the trimming operation consisting in machining the edge or periphery of the lens so as to shape it to the required size to adapt the lens for the glass frame in which it is supposed to be positioned.

The trimming is generally performed on a polishing device comprising diamond wheels that perform the machining as defined above.

The lens is held upon such an operation with axially-acting locking members.

The relative movement of the lens with respect to the wheel is controlled generally digitally so as to reach the desired shape.

As it appears, it is absolutely imperative that the lens be firmly held upon such a movement.

For that, before the trimming operation, an acorn-positioning for the lens, i.e. a holding means or acorn is placed above the lens convex surface.

A holding pad, such as a self-adhesive chip, for example a double side adhesive, is put between the acorn and the lens convex surface.

The so-equipped lens is positioned on one of the above-mentioned axial locking members, the second axial locking member being then adapted to lock the lens on the concave side thereof through an abutment, generally an elastomeric one.

Upon the machining, a tangential torque effort is generated on the lens, which may result in a lens rotation with respect to the acorn if the lens-holding system is not efficient.

The good lens holding mainly depends on the good adherence at the interface between the holding pad and the lens convex surface.

It has been shown that the technical problem is solved by depositing on a lens comprising a hydrophobic and/or hydrophobic surface coating a temporary protective layer imparting to the lens a surface energy at least equal to 15 mJoules/$m^2$.

Consequently it is possible to obtain a sufficient adherence at the interface holding pad/lens for conventionally used pads in the technical art.

Thus, the invention also relates to a lens, for example an ophthalmic lens, comprising a hydrophobic and/or oleophobic coating on which a multilayer, particularly a bilayer temporary protective layer, as defined above and preferably imparting to the lens a surface energy of at least 15 mJoules/$m^2$.

Generally the application of a hydrophobic and/or oleophobic surface coating a surface energy lower than 14 mJoules/$m^2$ and very frequently lower than or equal to 12 mJoules/$m^2$.

The multiple temporary protective layer will increase the lens surface energy up to a value of at least 15 mJoules/$m^2$.

The surface energies are calculated according to Owens-Wendt method disclosed in the following reference: "Estimation of the surface force energy of polymers", Owens D. K., Wendt R. G. (1969) J. APPL. POLYM. SCI., 13, 1741-1474.

The process of the invention may also be applied to lenses having already been submitted to a trimming step one side of which comprises a thin external organic and inorganic layer, preferably a hydrophobic and/or oleophobic one.

Referring to FIG. 1, a vacuum machine 1 has been illustrated for implementing the process according to the invention. Such a machine, being conventional, comprises a vacuum enclosure 10 within which a carrousel 11 provided with circular openings 12 adapted to receive the lenses to be treated, a bombardment device 13 acting with energetic and/or reactive species, for example an ion gun, a first material evaporating 14 such as for example an electron gun comprising a central crucible to contain the materials to be evaporated and a second material evaporation device 15, for example a Joule effect device.

Devices 16, 17, 18 such as mass flowmeters, are also provided for feeding appropriate gases such as argon and oxygen, to the bombardment device and such as oxygen, to the enclosure 10 of the machine, from external sources (not shown).

As illustrated in FIG. 1, the alteration of the back side of the lenses mainly occurs at the level of the external crown 11a of the carrousel 11 and more particularly in the squared area A.

FIG. 2 shows schematically a detail of the fastening of a pre-calibrated lens 20. Such a pre-calibrated lens is held with an intermediate part 21, adapted to the pre-calibrated lens shape, in the present case a triangular-like open spring holding the pre-calibrated lens by pinching between its branches. Such an intermediate part 21 is itself held by its three apexes in the conventional holding ring 22 used to hold round lenses in the openings 12 of the carrousel 11.

The process of the invention may be as an example implemented by using the machine according to FIG. 1 as follows.

The lenses to be treated are placed in the openings 12 of the carrousel 11, for example, with their concave sides exposed to the evaporation devices 14, 15 and the ion gun 13.

Then the activation of the lens concave surface by ion bombardment is conventionally performed and afterwards a conventional deposition under vacuum of a multilayer antireflecting coating through the evaporation device 14, and then a, thin external layer of a hydrophobic and/or oleophobic coating, for example, through the Joule effect device.

According to the invention, a deposition of the external temporary protective layer is then performed for example through the evaporation device 14.

The lenses are then put upside down and the convex side may be treated in a similar manner with no risk of alteration of the thin external hydrophobic/oleophobic layer of the concave side.

After a recovery and a possible trimming of the lenses, the temporary protective layers are removed.

If the protective layer is of a material increasing the surface energy of the external layer, it may be kept to favor the acorn-positioning for the lens during the trimming operation.

The temporary protective layer removing step may be carried out either in a liquid medium or by a dry wiping or even by a successive implementation of both those means or even by tearing away in the case of a bilayer, in particular a bilayer comprising a first layer of an inorganic nature and a second layer of an organic nature as described above.

The removal step in a liquid medium is preferably carried out with an acidic solution, in particular an orthophosphoric acid solution at molarities varying from 0.01 to 1 N.

The acidic solution may also comprise anionic, cationic or amphoteric surfactants.

The temperature at which the: removal step is made is variable, but generally the step is performed at room temperature.

The removal of the temporary protective layer may also be favored with a mechanical action, preferably by using ultrasounds.

In general, after a treatment with the liquid medium, such as the acidic solution, the dry wiping or a combination of both, the removal step comprises a cleaning step with an aqueous solution of a pH substantially equal to 7.

At the end of the temporary protective layer removing step, the lens has optical and surface treatment characteristics of the same order, even quasi identical to those of the initial lens comprising the hydrophobic and/or oleophobic coating.

The lenses comprising a temporary protective layer in an inorganic material may be marked with various inks currently used by the man in the art for progressive lenses.

Although the process is disclosed more particularly in the case of a deposition of antireflecting layers by conventional evaporation, the use of a temporary protective layer may be advantageously employed in the case of other deposition processes, such as the sputtering processes wherein the energies of the deposited particles vary from 10 to 40 eV under pressures from $10^{-1}$ to $10^{-3}$ mbar, and the plasma-assisted chemical vapor phase processes, for which the particle energy varies from 1 to 10 eV under pressures from $10^{-1}$ to $10^{-3}$ mbar.

Conventional examples of plasma-assisted chemical vapor phase reactions include the following reactions:
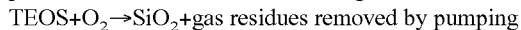
TEOS+$O_2 \rightarrow SiO_2$+gas residues removed by pumping
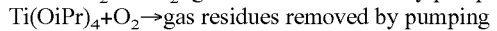
Ti(OiPr)$_4$+$O_2 \rightarrow$gas residues removed by pumping
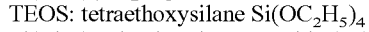
TEOS: tetraethoxysilane Si(OC$_2$H$_5$)$_4$
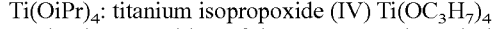
Ti(OiPr)$_4$: titanium isopropoxide (IV) Ti(OC$_3$H$_7$)$_4$ The decomposition of the precursors through the plasma and the presence of oxygen lead to ion or radical species such as $O^-$ or $(O_2)^+$ which are likely to alter the thin external layer.

EXAMPLE 1

The deposits are performed on substrates which are CR39®-based ophthalmic lenses comprising on both sides a polysiloxane-type anti-abrasive coating corresponding to Example 3 of Patent Application EP614957. The lenses are washed in an ultrasonic cleaning vessel and steamed for 3 hours minimum at a temperature of 100° C. They are then ready to be treated.

Two different types of lenses are treated:
round lenses,
pre-calibrated lenses as shown in FIG. 2.

1.1 Preparation of Lenses Comprising an Antireflecting Hydrophobic and/or Oleophobic Coating The vacuum treatment machine used is a machine Balzers BAK760 provided with an electron gun, an ion gun of the type "end-Hall" Mark2 Commonwealth and a Joule effect evaporation source.

The lenses are put on the carrousel with the concave side exposed to the evaporation sources and the ion gun.

The round lenses are arranged on the external crown of the carrousel (in the most treatment sensitive area) and in the central part of the carrousel.

The pre-calibrated lenses are also arranged both on the external crown and the central part of the carrousel.

A vacuum drawing is performed until a secondary vacuum is reached.

The substrate surface is activated by bombardment with argon and oxygen (Ar and $O_2$) ion beam through the ion gun of the model type "end-Hall" Mark2 from Commonwealth. The gun is set so that the ion energy should be 80 eV and the current density at the level of the substrate in the gun axis be from 40 to 70 microamperes per cm$^2$. The substrates are exposed to the ion bombardment during 1 minute.

Afterwards, after interruption of the ion bombardment, a sequential evaporation is carried out with the electron gun to form 4 optical antireflecting layers of high index (HI), low index (LI), HI, LI: $ZrO_2$, $SiO_2$, $ZrO_2$, $SiO_2$.

Finally, a layer of a hydrophobic and oleophobic coating is deposited by evaporation of a product of trademark OPTOOL DSX (compound comprising perfluoropropylene patterns) sold by DAIKIN.

A determined quantity of Optool DSX is put in a copper cup of 18 mm diameter being itself arranged in a Joule effect crucible (tantalum crucible).

A 2 nm thickness of a hydrophobic and oleophobic coating is then deposited by evaporation.

The checking of the deposited thickness is carried out with quartz scales.

1.2 Deposition of the Temporary Protective Layer

The evaporation of the protective layer is then carried out.

The deposited material is a compound of formula $MgF_2$ with a particle size from 1 to 2.5 mm sold by Merck.

The evaporation is performed with the electron gun.

The physical thickness deposited is 20 nm, at a deposition rate of 0.52 nm/s.

The checking of the thickness deposited is carried out with quartz scales.

Afterwards, the enclosure is heated and the treatment chamber is put again at the room atmosphere.

The lenses are then put upside down with their convex side oriented towards the treatment area. The convex side is treated identically with the concave side (by reproducing the steps 1.1 and 1.2 above-mentioned).

The temporary layer of $MgF_2$ coated on the convex side in the last step has then the objective to increase the surface energy of the convex side so as to be able to perform an acorn-positioning operation, i.e. for positioning said side through a holding means or acorn, thereby serving to hold the lens during the final machining operation of the lens periphery (trimming) so as to adapt it to the frame shapes.

The lenses are trimmed through a polishing device and finally mounted on the frame.

1.3 Removal of the Temporary Layer

The lenses are wiped with the help of a usual cotton cloth to remove the temporary protective layer. The colorimetric values after the removal of the $MgF_2$ layer are the same as those of the treatment with no $MgF_2$: the $MgF_2$ and the removal operation thereof do no modify the colorimetric characteristics of the antireflecting treatment.

EXAMPLE 2

The substrates are varnished CR39® ophthalmic lenses similar to those used in Example 1. They are washed in an ultrasonic cleaning vessel and then steamed during 3 hours minimum at a temperature of 100° C.

2.1 Preparation of Lenses Comprising a Hydrophobic and/or Oleophobic Coating

The vacuum treatment machine used is a machine Leybold LH1104 provided with an electron gun, an ion gun of the type Mark2 and a Joule effect evaporation source.

The lenses are put on the carrousel with the concave side exposed to the evaporation sources and the ion gun.

The round lenses are arranged both on the external crown of the carrousel (in the most treatment sensitive area) and in the central part of the carrousel.

The pre-calibrated lenses are also arranged both on the external crown and the central part of the carrousel.

A vacuum drawing is performed until a secondary vacuum is reached.

Afterwards, a sequential evaporation is carried out by heating of the source with the electron gun to form 4 optical antireflecting layers of high index (HI), low index (LI), HI, LI: $ZrO_2$, $SiO_2$, $ZrO_2$, $SiO_2$.

The third layer of $ZrO_2$ is evaporated with the technical assistance (IAD) to improve its compaction. The ion gun is operated at the same time as the electron gun. An $ZrO_2$ material OPTRON is evaporated in presence of an oxygen ion flow. The ion gun is set so that the ion energy should be 120 eV and the current density at the level of the substrate in the axis of the ion gun be from 50 to 70 microamperes per $cm^2$.

Afterwards, a hydrophobic and oleophobic coating is deposited by evaporation by Joule effect of a product of trademark OPTOOL DSX (compound comprising perfluoropropylene patterns) sold by DAIKIN.

The product under a liquid form is poured into a copper cup of 18 mm diameter being it self arranged in a Joule effect crucible (tantalum crucible).

A 2 nm thickness of a hydrophobic and oleophobic coating is then deposited by evaporation.

The checking of the deposited thickness is carried out with quartz scales.

2.2 Deposition of the Temporary Protective Layer

The temporary layer is deposited according to the same procedure as in step 1.2 above.

The lenses are then put upside down with their convex side oriented towards the treatment area and treated identically with the concave side, by reproducing the steps 2.1 and 2.2 above-mentioned.

The lenses are trimmed and then mounted into the frame.

2.3 Removal of the Temporary Layer

The procedure is the same as the step 1.3 above.

COMPARATIVE EXAMPLE 1

The Example 1 is identically reproduced, but without the steps of deposition and then removal of the temporary layer of $MgF_2$ (steps 1.2 and 1.3)

COMPARATIVE EXAMPLE 2

The Example 2 is identically reproduced, but without the steps of deposition and then removal of the temporary layer of $MgF_2$ (steps 2.2 and 2.3).

The resulting lenses from the various examples are submitted to the oil test.

Description of the Oil Test

The operator pours an oil droplet commercially available under the trademark "three in one" with WD40 company onto the concave or convex surface of the lens to be tested with a pipette and tilts the lens so as to allow the droplet to flow on the surface under its own weight.

The results are interpreted as follows.

Good Test

The oil does not wet, but retracts. The trace is discontinuous.

That is what is obtained if the treatment surface energy is very weak, for example for a hydrophobic and oleophobic layer obtained from the Optool DSX treatment.

Bad Test

The oil wets. The trace is continuous and well marked.

That is what is obtained if the hydrophobic and oleophobic coating has been altered during the second side treatment.

This test is very selective and allows to highlight a very weak increase of the surface energy.

The aspect of the oil trace is shown in FIG. 3. The results are summarized in the following table.

SUMMARIZED TABLE OF THE RESULTS

| | Step during which the alteration occurs | Oil test on CC side (first side treated) after removal of the protective layer of MgF$_2$ | | | Oil test on CC side (first side treated) with no protective layer of MgF$_2$ | | |
|---|---|---|---|---|---|---|---|
| | | Round lens | | Pre-calibrated lens All crowns | Round layer | | Pre-calibrated lens All crowns |
| | | Centre crown | External crown | | Centre crown | External crown | |
| Ex. 1 | | Good | Good | Good | | | |
| Ex. Comp. 1 | IPC | | | | Good | Bad | Bad |
| Ex. 2 | | Good | Good | Good | | | |
| Ex. Comp. 2 | IAD | | | | Bad | Bad | Bad |

CC side: Concave side

The invention claimed is:

1. A process for treating an ophthalmic lens comprising a first side and a second side, wherein at least the first side comprises a thin external organic or inorganic layer, the process comprising at least one treatment of the second side with energetic and/or reactive species resulting in surface physical attack and/or chemical modification, wherein prior to the treatment with the energetic and/or reactive species, a deposition of a temporary protective layer is performed onto the thin external organic or inorganic layer of the first side.

2. The process of claim 1, wherein at least one or more depositions of inorganic or organic layers are performed simultaneously on the second side with or subsequently to the treatment with the energetic and/or reactive species.

3. The process of claim 2, wherein the at least one or more depositions of inorganic or organic layers are performed by vacuum evaporation.

4. The process of claim 3, wherein the treatment comprises an ion bombardment performed simultaneously with the at least one or more depositions of inorganic or organic layers.

5. The process of claim 1, wherein the thin external layer has a thickness lower than 30 nm.

6. The process of claim 5, wherein the thin external layer has a thickness of from 1 to 20 nm.

7. The process of claim 6, wherein the thin external layer has a thickness of from 1 to 10 nm.

8. The process of claim 1, wherein the thin external layer is an organic material layer.

9. The process of claim 1, wherein the thin external layer is a hydrophobic and/or oleophobic layer.

10. The process of claim 1, wherein the thin external layer is deposited on a multilayer anti-reflecting coating.

11. The process of claim 1, wherein the temporary protective layer has a thickness of from 5 to 200 nm.

12. The process of claim 1, wherein the temporary protective layer is continuous.

13. The process of claim 1, wherein the temporary protective layer is comprised of a metal fluoride, a mixture of metal fluorides, a metal oxide, or a mixture of metal oxides.

14. The process of claim 13, wherein the temporary protective layer comprises a metal fluoride further defined as MgF$_2$, LaF$_3$ or CeF$_3$.

15. The process of claim 13, wherein the temporary protective layer comprises a metal oxide further defined as TiO$_2$, Al$_2$O$_3$, ZrO$_2$, or a mixture of alumina and praseodymium oxide.

16. The process of claim 1, wherein the temporary protective layer is a polytetrafluoroethylene layer.

17. The process of claim 1, wherein the first side of the lens is a concave side.

18. The process of claim 1, wherein the ophthalmic lens is a pre-calibrated or trimmed lens.

19. The process of claim 1, comprising treatment with an energetic species with energy from 1 to 150 eV.

20. The process of claim 19, comprising treatment with an energetic species with energy from 10 to 150 eV.

21. The process of claim 20, comprising treatment with an energetic species with energy from 40 to 150 eV.

22. The process of claim 1, wherein the treatment comprises an ion bombardment.

23. The process of claim 1, wherein the treatment is an activation treatment performed before deposition of a multilayer coating onto the second side of the lens.

24. The process of claim 23, wherein the treatment is chosen from an ion bombardment, a plasma treatment, or a corona treatment.

25. The process of claim 1, wherein at least one layer of a multilayer coating has been deposited onto the second side of the lens and wherein the treatment is an activation treatment performed so as to prepare the surface of said at least one layer before the deposition of the subsequent layer of said multilayer coating.

26. The process of claim 1, wherein no deposition of inorganic or organic layer is performed simultaneously with the treatment with the energetic or reactive species.

27. A lens comprising a hydrophobic and/or oleophobic coating imparting to the lens a surface energy of 14 mJ/M$^2$ or less, wherein a multilayer temporary protective layer is deposited onto said coating.

28. The lens of claim 27, wherein the multilayer temporary protective layer is a bilayer.

29. The lens of claim 28, wherein the temporary protective bilayer comprises a first layer of an inorganic nature and a second layer of an organic nature on the first layer.

30. The lens of claim 29, wherein the first layer of an inorganic nature has a thickness from 2 to 200 nm.

31. The lens of claim 30, wherein the first layer of an inorganic nature has a thickness ranging from 5 to 200 nm.

32. The lens of claim 29, wherein the layer of an organic nature has a thickness ranging from 0.2 to 10 microns.

33. The lens of claim 29, wherein the layer of an inorganic nature comprises a metal fluoride, a mixture of metal fluorides, a metal oxide or a mixture of metal oxides.

34. The lens of claim 33, wherein the metal fluoride is selected from the group consisting of MgF$_2$, LaF$_3$ and CeF$_3$ and the metal oxide is selected amongst the titanium, aluminum, zirconium and praseodymium oxides.

35. The lens of claim 29, wherein the layer of an organic nature is selected from the group consisting of acrylic latexes, methacrylic latexes, and polyurethane latexes.

36. The lens of claim 27, wherein the multilayer temporary protective layer imparts to the lens a surface energy at least equal to 15 mJ/m$^2$.

37. The lens of claim 27, wherein the hydrophobic and/or oleophobic coating imparts to the lens a surface energy of 12 mJ/m$^2$ or less.

38. A pre-calibrated lens comprising at least one side comprising a thin external organic or inorganic layer coated with a temporary protective layer.

39. The pre-calibrated lens of claim 38, wherein the temporary protective layer comprises:
   a layer comprising polytetrafluoroethylene;
   a first layer of inorganic nature comprising a thickness ranging from 5 to 200 nm, and a second layer of organic nature coated onto said first layer; or
   a layer made of a metal fluoride, a mixture of metal fluorides, a metal oxide, a mixture of metal oxides.

40. The pre-calibrated lens of claim 39, wherein said second layer of organic nature is obtained by deposition and hardening of a latex.

41. The pre-calibrated lens of claim 39, wherein the metal fluoride is $MgF_2$, $LaF_3$ or $CeF_3$.

42. The pre-calibrated lens of claim 39, wherein the metal oxide or mixture of metal oxides is $TiO_2$, $Al_2O_3$, $ZrO_2$, praseodymium oxide or a mixture of alumina and praseodymium oxide.

43. The pre-calibrated lens of claim 38, wherein the thin external organic or inorganic layer is a hydrophobic and/or oleophobic coating imparting to the lens a surface energy of 14 mJ/m$^2$ or less.

44. The lens of claim 38, wherein the thin external organic or inorganic layer is a hydrophobic and/or oleophobic coating imparting to the lens a surface energy of 12 mJ/m$^2$ or less.

45. A lens comprising two main sides, at least the first one of which comprising a thin external organic or inorganic layer coated with a temporary protective layer, wherein the temporary protective layer comprises a layer comprising polytetrafluoroethylene.

46. The lens of claim 45, wherein the thin external organic or inorganic layer is a hydrophobic and/or oleophobic coating.

47. The lens of claim 45, wherein said lens is an ophthalmic lens.

48. The lens of claim 45, wherein the thin external layer is deposited on a multilayer antireflecting coating.

* * * * *

UNITED STATES PATENT AND TRADEMARK OFFICE
CERTIFICATE OF CORRECTION

PATENT NO. : 7,629,053 B2
APPLICATION NO. : 10/501600
DATED : December 8, 2009
INVENTOR(S) : Lacan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1141 days.

Signed and Sealed this

Twelfth Day of October, 2010

David J. Kappos
*Director of the United States Patent and Trademark Office*